United States Patent
Shiraki et al.

(10) Patent No.: US 7,099,807 B2
(45) Date of Patent: Aug. 29, 2006

(54) COMMUNICATION PATH DESIGNING METHOD, COMMUNICATION PATH DESIGNING DEVICE, AND PROGRAM TO HAVE COMPUTER EXECUTE SAME METHOD

(75) Inventors: Takashi Shiraki, Minato-Ku (JP); Hiroyuki Saito, Minato-Ku (JP)

(73) Assignee: NEC Corporation, Tokyo (JP)

( * ) Notice: Subject to any disclaimer, the term of this patent is extended or adjusted under 35 U.S.C. 154(b) by 811 days.

(21) Appl. No.: 10/157,990

(22) Filed: May 31, 2002

(65) Prior Publication Data

US 2002/0181403 A1 Dec. 5, 2002

(30) Foreign Application Priority Data

May 31, 2001 (JP) .............................. 2001-165036

(51) Int. Cl.
*G06F 17/10* (2006.01)
*G06F 7/60* (2006.01)
*G06F 9/44* (2006.01)

(52) U.S. Cl. .......................................... 703/2; 703/21
(58) Field of Classification Search .................. 703/2; 370/255

See application file for complete search history.

(56) References Cited

U.S. PATENT DOCUMENTS

| 5,467,343 | A | | 11/1995 | Lee et al. |
| 5,583,860 | A | * | 12/1996 | Iwakawa et al. ............. 370/232 |
| 5,781,624 | A | * | 7/1998 | Mitra et al. .................. 379/244 |
| 6,404,744 | B1 | * | 6/2002 | Saito ........................... 370/255 |

FOREIGN PATENT DOCUMENTS

| JP | 6-90235 | 3/1994 |
| JP | 9-83546 | 3/1997 |
| JP | 10-341236 | 12/1998 |
| JP | 2000-286896 | 10/2000 |
| JP | 2002-64536 | 2/2002 |

OTHER PUBLICATIONS

Hirashima et al., "Examination of IP Positioning Server Which Provides QoS Assurance Type Service", Electronic Information Communications Association Technology Research Report SSE2000-172, Nov. 14, 2000.
Tanabe et al., "ATM Network Design Tool Mount", Electronic Information Communications Association Technology Research Report SSE98-105, Sep. 25, 1998.
Nakamura et al., "An Optimization method for a Multi-Term Circuit Routing Problem of Transport Networks", Electronic Information Communications Association Technology Research Report IN94-101, Oct. 17, 1994.
Yano, *Mathematics Handbook*, 1985, pp. 1041-1047 and 1097-1100.

* cited by examiner

*Primary Examiner*—Paul L. Rodriguez
*Assistant Examiner*—Andre Pierre-Louis
(74) *Attorney, Agent, or Firm*—Young & Thompson

(57) ABSTRACT

A communication path designing method and device includes creating a path candidate use device function and condition to produce a constraint expression serving as a constraint condition to select a communication path that can satisfy a traffic demand, creating a first link receiving condition to produce a constraint expression serving as a constraint condition based on a resource of a network to be shared according to a plurality of service classes, creating a second link receiving condition to produce an objective function to be used as a reference to select a communication path, and optimizing the communication path by solving a mathematical programming problem made up of the above various constraint expressions and objective functions.

9 Claims, 4 Drawing Sheets

COMMUNICATION PATH DESIGNING METHOD, COMMUNICATION PATH DESIGNING DEVICE, AND PROGRAM TO HAVE COMPUTER EXECUTE SAME METHOD

BACKGROUND OF THE INVENTION

1. Field of the Invention

The present invention relates to a communication path designing method and a communication path designing device to design a communication path to be used according to a service class on a network having a plurality of links that can receive packets each being handled according to a different service class and a plurality of nodes that can differentiate packets according to a service class and can receive the differentiated packets.

The present application claims priority of Japanese Patent Application No.2001-165036 filed on May 31, 2001, which is hereby incorporated by reference.

2. Description of the Related Art

As a mechanism to control QoS (Quality of Service) in throughput, delay in transmission of data, reliability in communications or a like for end-to-end communications, for example, "DiffServ" (Differential Services) technology being now under a process of standardization by IETF (Internet Engineering Task Force) is known.

The DiffServ is used to differentiate packets that flow in and out from a network. In the DiffServ technology, each packet is provided with a specified "Codepoint" corresponding to a service class (precedence) which is assigned based on an SLA (Service Level Agreement) agreed between a manager of a network and a user of the network for transmission of packets.

The Codepoint employed in the DiffServ technology is used to identify precedence to be given to a packet and is made up of a bit pattern indicating a service class including the class to be processed by an EF (Expedited Forwarding) method, AF (Assured Forwarding) methods (including the methods 1–4), or BF (Best Effort Forwarding) method. The EF method class can provide highest precedence, which is used for forwarding of voice data or for transfer data using a virtual IP (Internet Protocol) private line. The BF method class provides lowest precedence, which is used in a Best—Effort—type data transfer in which the QoS during transmission is not guaranteed.

The AF method class provides four types of precedence (AF1, AF2, AF3, and AF4) which are classified as intermediate precedence between the EF method and BF method classes. For example, the AF1 has highest precedence and the precedence decreases in order of AF2 to AF4.

As protocols for receiving and transmitting data in the Internet, a TCP (Transmission Control Protocol) and a UDP (User Datagram Protocol) are known. In the case of the TCP, after a packet is transmitted, an Acknowledge message from a destination to which the packet was transmitted is waited for and then a subsequent packet is forwarded. In the case of the UDP, after a packet is transmitted, a packet is continuously forwarded without waiting for an Acknowledge message from a destination. The service class described above also can be assigned to each of the TCP and UDP.

When a packet or a like is transmitted between an arbitrary node and another node both making up a network, a communication path is designed in a manner so as to meet a specified traffic demand. The traffic demand represents a requirement for a communication path to be created on a network to transmit a packet or a like in order to achieve forwarding of a packet or a like in accordance with contents agreed in the above SLA including, for example, a transfer band, delay time, costs or a like. The communication path designing device selects a communication path that can meet the traffic demand.

Conventionally, when such the communication path as described above on a network based on specified requirements is designed, a designing method disclosed, for example, in Japanese Patent Application Laid-open No. Hei 6-90235 or No. Hei 9-83546 has been used.

However, in the designing method disclosed in the above applications, no specified service class as described above is designated. Therefore, in order to design a communication path that can satisfy contents specified as a service class, the designing has to be made in a manner that most rigorous conditions required to satisfy contents specified as a service class are to be met or in a manner that links or nodes being components making up the network are assigned to satisfy each of contents designated as the service class.

However, the above conventional method for designing a communication path in which the designing has to be made in a manner that most rigorous conditions required to satisfy contents specified as a service class are to be met has a problem in that excessive quality of service is provided to satisfy the traffic demand for a part of service classes, which, as a result, causes wasteful consumption of a resource of a network.

Also, the above conventional method for designing a communication path in which the designing has to be made in a manner that links or nodes being components making up the network are assigned to satisfy each of contents designated as a service class has a problem in that, even if resources assigned to satisfy contents designated as the service class are sufficiently available, since the assigned resources cannot be used, as a substitutional one, to satisfy contents specified according to other service class, which causes impediment to effective utilization of network resources.

SUMMARY OF THE INVENTION

In view of the above, it is an object of the present invention to provide a communication path designing method and a communication path designing device which enable efficient use of a network resource while satisfying requirements designated according to a service class.

According to a first aspect of the present invention, there is provided a method for designing a communication path to be used according to a service class on a network having a plurality of nodes being able to receive packets to be processed according to a plurality of service classes being different from each other with each of the packets being distinguished from each other and having a plurality of links serving as a transmission path used to establish connection between nodes each receiving packets to be processed according to the plurality of service classes being different from each other, the method including;

a first step of producing a first constraint expression to be used as a constraint condition for selecting a communication path that satisfies a traffic demand containing requirements for the communication path;

a second step of producing a second constraint expression to be used as a constraint condition based on a resource of the network to be shared according to the plurality of service classes;

a third step of producing a third constraint expression to be used as a constraint condition based on a resource of the network to be provided according to the plurality of service classes;

a fourth step of producing an objective function to be used as a reference for selection of optimized the communication path; and a fifth step of designing the communication path by solving a mathematical programming problem made up of the first constraint expression produced in the first step, the second constraint expression produced in the second step, the third constraint expression produced in the third step, and the objective function produced in the fourth step.

In the first aspect, a preferable mode is one wherein the second step include a process of creating a link receiving condition to produce a constraint expression to be used so that a total transfer band required in the traffic demand does not exceed a device capacity of the link and a process of creating a node receiving condition to produce a constraint expression to be used so that a total transfer band required in the traffic demand does not exceed a device capacity of the node; and wherein the third step includes a process of creating a queue receiving condition to produce a constraint expression to be used so that a total transfer band required in the traffic demand does not exceed a transfer band of the queue, based on a transfer band set in advance in the queue which is mounted on the node according to the service class and saves temporarily data of the packet.

According to a second aspect of the present invention, there is provided a communication path designing device for designing a communication path to be used according to a service class on a network having a plurality of nodes being able to receive packets to be processed according to a plurality of service classes being different from each other with each of the packets being distinguished from each other and having a plurality of links serving as a transmission path used to establish connection between nodes each receiving packets to be processed according to the plurality of service classes being different from each other, the communication path designing device including:

a processing unit to perform a first process of producing a first constraint expression to be used as a constraint condition for selecting a communication path that satisfies a traffic demand containing requirement for the communication path;

a second process of producing a second constraint expression to be used as a constraint condition based on a resource of the network to be shared according to the plurality of service classes;

a third process of producing a third constraint expression to be used as a constraint condition based on a resource of the network to be provided according to the plurality of service classes;

a fourth process of producing an objective function to be used as a reference for selection of optimized the communication path; and a fifth process of designing the communication path by solving a mathematical programming problem made up of the first constraint expression produced in the first process, the second constraint expression produced in the second process, the third constraint expression produced in the third process, and the objective function produced in the fourth process.

In the second aspect, a preferable mode is one wherein the second process include a process of creating a link receiving condition to produce a constraint expression to be used so that a total transfer band required in the traffic demand does not exceed a device capacity of the link and a process of creating a node receiving condition to produce a constraint expression to be used so that a total transfer band required in the traffic demand does not exceed a device capacity of the node; and wherein the third process includes a process of creating a queue receiving condition to produce a constraint expression to be used so that a total transfer band required in the traffic demand does not exceed a transfer band of the queue, based on a transfer band set in advance in the queue which is mounted on the node according to the service class and saves temporarily data of the packet.

According to a third aspect of the present invention, there is provided a program to have a computer design a communication path to be used according to a service class on a network having a plurality of nodes being able to receive packets to be processed according to a plurality of service classes being different from each other with each of the packets being distinguished from each other and a plurality of links serving as a transmission path used to establish connection between nodes each receiving packets to be processed according to the plurality of service classes being different from each other, the program including:

a first process of producing a first constraint expression to be used as a constraint condition for selecting a communication path that satisfies a traffic demand containing requirement for the communication path;

a second process of producing a second constraint expression to be used as a constraint condition based on a resource of the network to be shared according to the plurality of service classes;

a third process of producing a third constraint expression to be used as a constraint condition based on a resource of the network to be provided according to the plurality of service classes;

a fourth process of producing an objective function to be used as a reference for selection of optimized the communication path; and a fifth process of designing the communication path by solving a mathematical programming problem made up of the first constraint expression produced in the first process, the second constraint expression produced in the second process, the third constraint expression produced in the third process, and the objective function produced in the fourth process.

In the third aspect, a preferable mode is one wherein the second process include a process of creating a link receiving condition to produce a constraint expression to be used so that a total transfer band required in the traffic demand does not exceed a device capacity of the link and a process of creating a node receiving condition to produce a constraint expression to be used so that a total transfer band required in the traffic demand does not exceed a device capacity of the node; and wherein the third process includes a process of creating a queue receiving condition to produce a constraint expression to be used so that a total transfer band required in the traffic demand does not exceed a transfer band of the queue, based on a transfer band set in advance in the queue which is mounted on the node according to the service class and saves temporarily data of the packet.

With the above configurations, a communication path that satisfies for every service class can be selected with a network resource such as a link or a node being shared by performing processing of creating path candidate use device functions and conditions to produce a constraint expression serving as a constraint condition to select a communication path that can satisfy a traffic demand, processing of creating at first link receiving condition to produce a constraint expression serving as a constraint condition based on a resource of a network to be shared according to a plurality of service classes, processing of creating a second link receiving condition to produce an objective function to be used as a reference to select a communication path, and processing of optimization to design the communication path by solving mathematical programming problems made up of the above various constraint expressions and objective function.

Therefore, a communication path that uses a network resource effectively can be designed when compared with a method in which a communication path is designed to satisfy most rigorous conditions required in a service class or in which a link or a node is assigned according to a service class. Moreover, since communication paths each satisfying each of a plurality of traffic demands can be simultaneously obtained, simultaneous designing of a communication path for a plurality of service classes is made possible.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings.

EMBODIMENT

Figure 1:
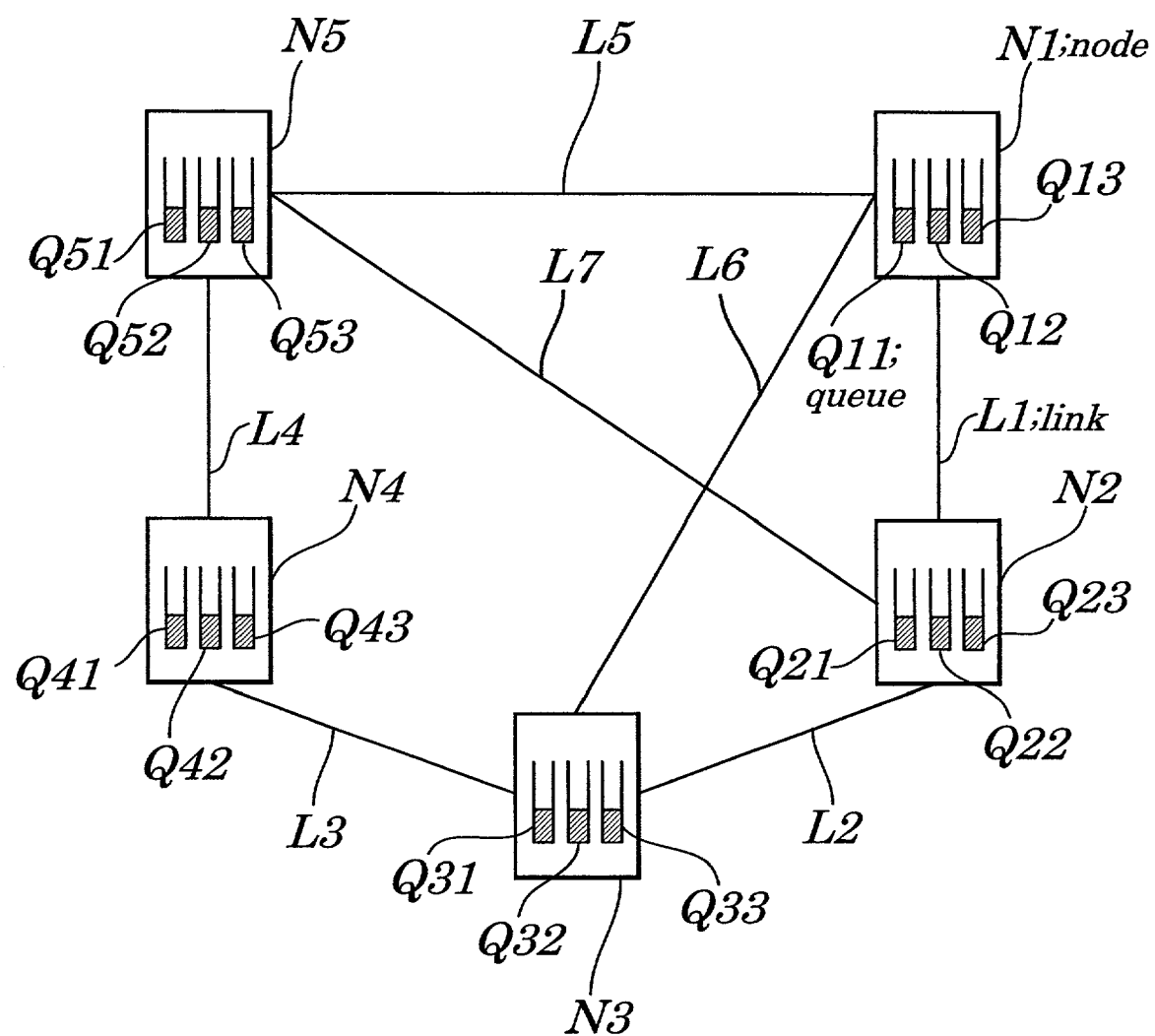
FIG. 1 is a schematic block diagram showing one example of configurations of a network to which a communication path designing method of the present invention is applied.
Figure 2:
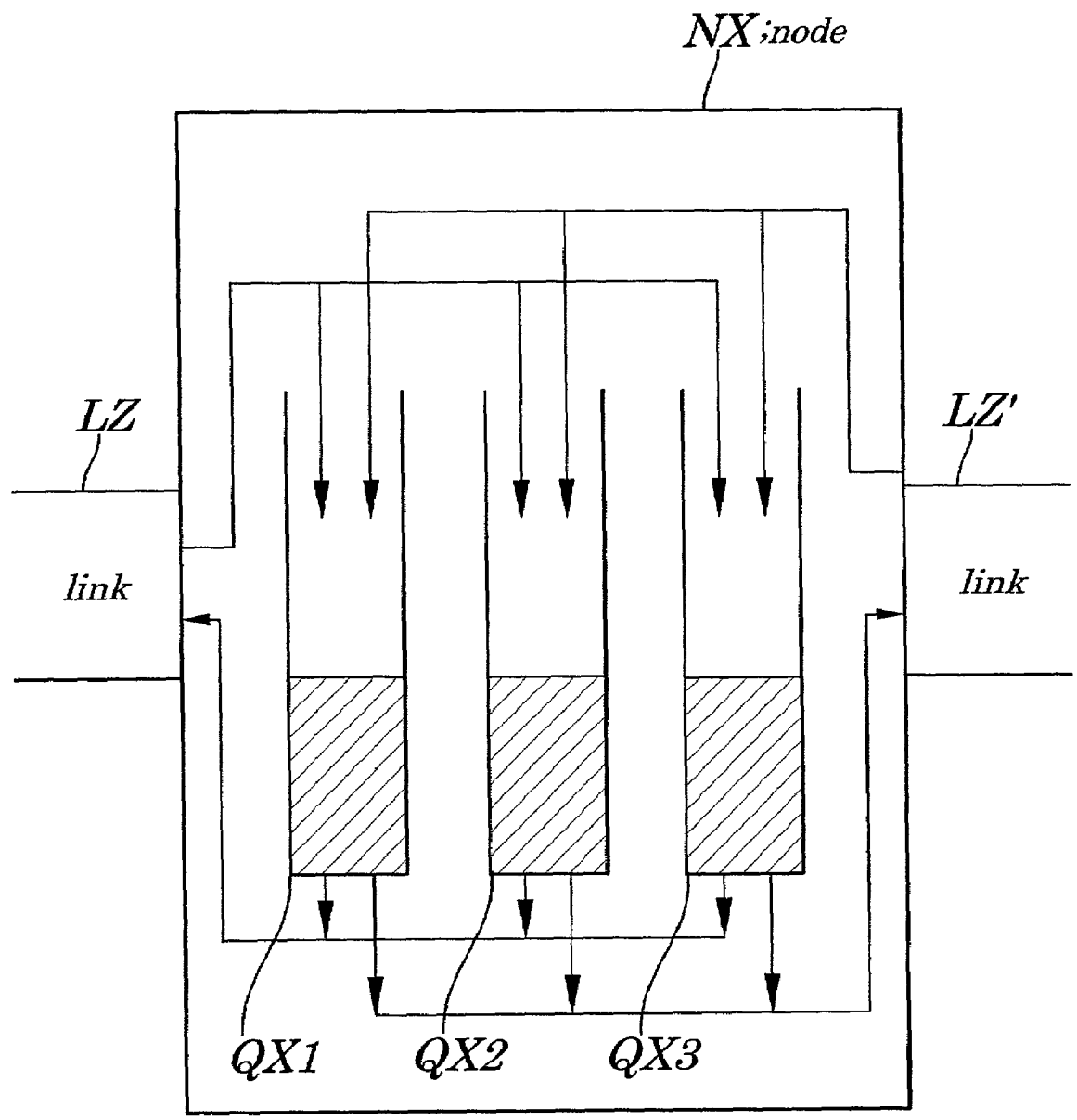
FIG. 2 is a schematic diagram showing configurations of a queue with which a node shown in FIG. 1 is provided.

FIG. 1 is a schematic block diagram showing one example of configurations of a network to which a communication path designing method of the present invention is applied. FIG. 2 is a schematic diagram showing configurations of a queue with which a node shown in FIG. 1 is provided.

As shown in FIG. 1, the network of the embodiment includes a plurality of nodes NX (X=1 to 5 in FIG. 1) made up of a router, switch or a like and a plurality of links LZ (Z=1 to 7 in FIG. 1) each being connected among the nodes NX serving as a transmission path to forward a packet or a like bidirectionally.

As shown in FIG. 2, each of the nodes NX has a plurality of FIFO (First-in First-out)—type packet buffers (hereinafter called "queues") QX1 to QX3 (X denotes a number of the node, X=1 to 5) to temporarily save packet data for every service class.

Each of the nodes NX stores once a packet which has arrived through each of the corresponding links LZ from a neighboring node in each of the queues QX1 to QX3 provided corresponding each service class and then transfers the packet to an other node according to destination.

Moreover, in FIG. 1, five pieces of the nodes NX are connected by seven pieces of links LZ and each of the nodes NX has three pieces of the queues QX1 to QX3, however, the number of the nodes, links and queues is not limited to that shown in FIG. 1 and any number of them can be employed.

Next, configurations of the communication path designing device of the present invention will be described by referring to drawings.

Figure 3:
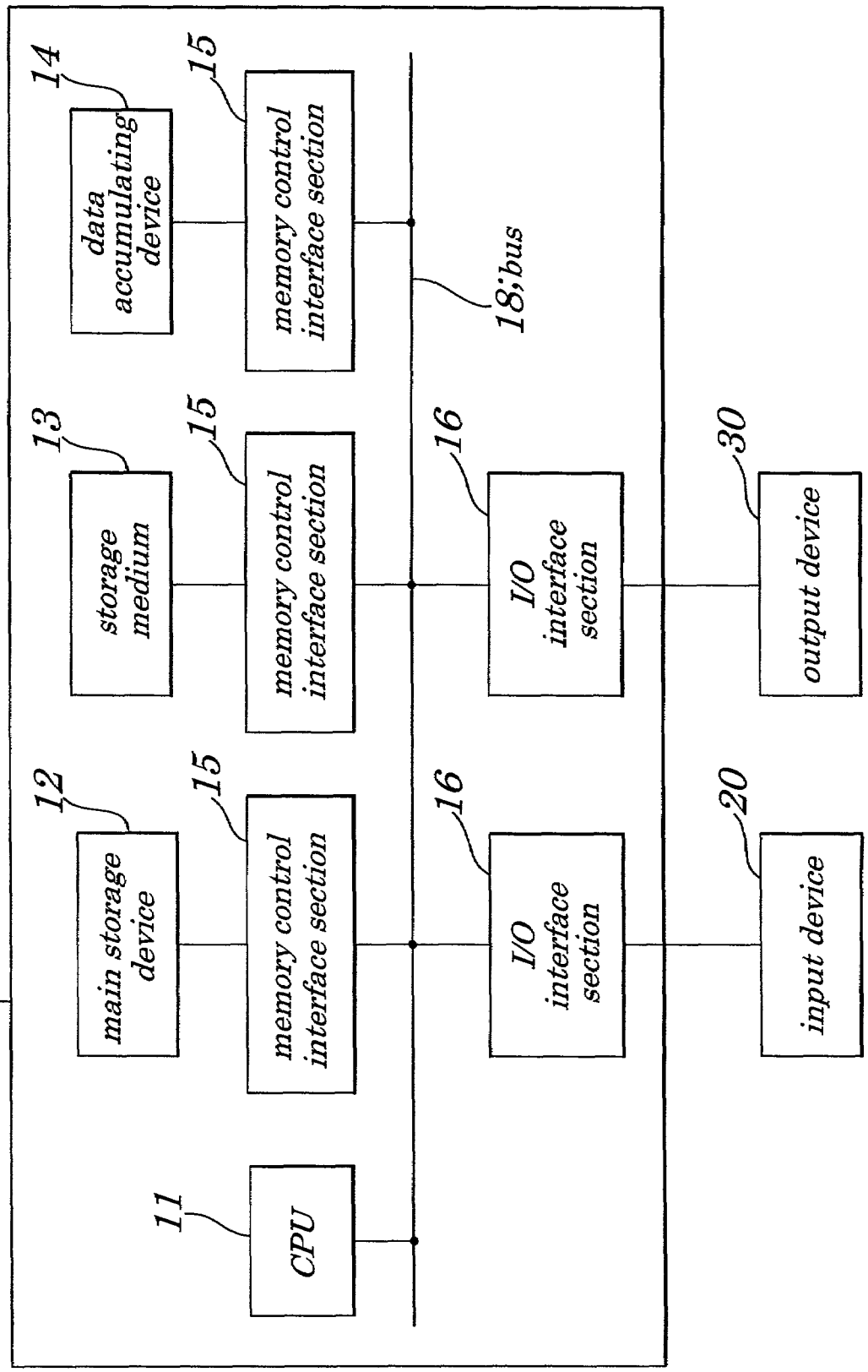
FIG. 3 is a schematic block diagram showing one example of a communication path designing device of the present invention.

FIG. 3 is a schematic block diagram showing one example of a communication path designing device of the present invention.

As shown in FIG. 3, the communication path designing device of the present invention has a processing unit 10 serving as an information processing unit such as a workstation, server computer or a like, and thus executing specified processes according to a program, an input device 20 to input a command, information, or a like to the processing unit 10, and an output device 30 to monitor a result from processing performed by the processing unit 10.

The processing unit 10 includes a CPU (Central Processing Unit) 11, a main storage device 12 to temporarily save information required for processing by the CPU 11, a storage medium 13 storing a control program to have the CPU 11 design a communication path, a data accumulating device 14 in which data required for designing the communication path are accumulated, a memory control interface section 15 to control data transfer among the main storage device 12, storage medium 13, data accumulating device 14, and an I/O interface section 16 serving as an interface device between the input device 20 and output device 30. These components are connected to each other through a bus 18. Moreover, if the communication path designing device is connected to the node or a like being a component of a network, a communication control device serving as an interface to control communications with nodes may be mounted.

The processing unit 10 reads a control program stored in the storage medium 13 and performs processing of designing a communication path described below in accordance with the control program. Moreover, as the storage medium 13, a magnetic disk, semiconductor memory, optical disk or other storage medium may be used.

In the data accumulating device 14 in the communication path designing device, as data required for designing a communication path, for example, are accumulated information used to identify each node or each link, information about configurations of a network, metric value of each link, or a like. The metric represents an index used when a communication path is designed and includes, for example, delay time in the communication path, hop count (a number of nodes on the path), costs, generic metric being a value arbitrarily set on a link or a node by a manager of a network.

In the communication path designing device, a mathematical programming problem to select a communication path that can satisfy a traffic demand based on the above data and on performance figures (band, delay, costs or alike) required in a communication path to be designed is produced. Then, by solving the mathematical programming problem, a communication path is selected and created.

Figure 4:
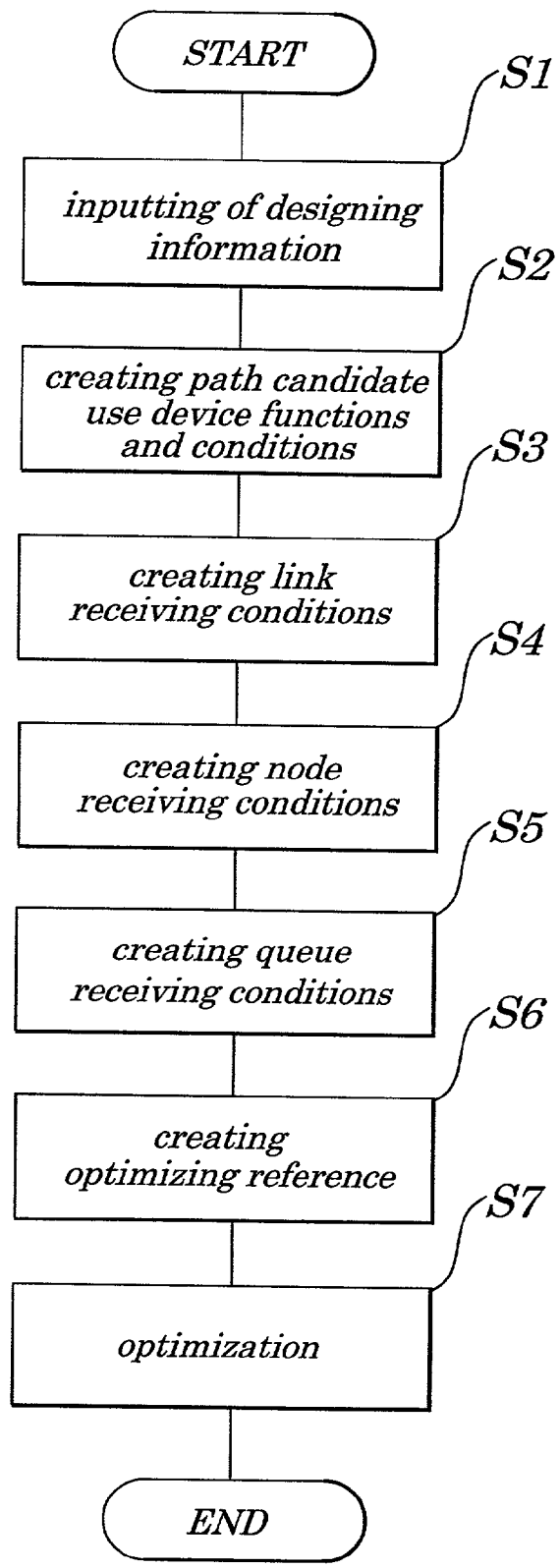
FIG. 4 is a flowchart showing processing procedures for designing a communication path of the present invention.

Next, processing procedures for designing a communication path of the present invention will be described by referring to FIG. 4. Hereinafter, a case where a communication path is created on the network having configurations shown in FIG. 1 is explained. FIG. 4 is a flowchart showing processing procedures for designing a communication path of the present invention.

To design a communication path to be used for every service class, it is necessary to set both a constraint condition for a network resource to be shared in each service class and a constraint condition for the network resource to be provided in every service class. The network resource to be shared includes a link, node, or a like and the constraint condition is that amounts (amount of packets) of all traffic flowing in the link or node do not exceed a capacity of the link, node, or the like. On the other hand, the network resource to be provided in every service class includes a queue corresponding each service class that each node has and the constraint condition is that amounts (amount of packets) of all traffic flowing in the queue do not exceed a processing capability (capacity) of the queue.

In the communication path designing device, these constraint conditions and an objective function serving as a reference for selecting a communication path are produced and, by solving a mathematical programming problem made up of these constraint conditions and the objective function, a specified path that can satisfy a traffic demand is selected out of candidates of a path given in advance.

Let it be assumed here that network configuration information such as information about a connecting relation (network topology) among links and nodes, configuration of a queue that each node has, capacity $C_{LZ}$ of all the links LZ, capacity $C_{NX}$ of all the nodes NX, capacity $C_{QXY}$ of a queue QXY in which a packet of a service class Y being contained in all the nodes NX is accumulated, or a like, is input, in advance, to the communication path designing device and is accumulated in the data accumulating device 14.

As shown in FIG. 4, when a communication path is designed, designing information including information about a group of a traffic demand, path candidate, optimizing reference, or a like is input to the communication path designing device (Step S1). The optimizing reference includes a reference for minimization of total delay time in the communication path, for minimization of largest hop counts, minimization of costs, minimization of a generic metric, or a like. In the embodiment, an instruction to minimize total delay time is input. Moreover, as a candidate for a communication path, set of candidates for the communication path to satisfy each traffic demand is input.

Moreover, as the traffic demand, input is information about an entrance node used to guide a packet into a network, an exit node used to guide a packet out of the network, a transfer band being required, service class, or a like. Here, an i-th traffic demand is given by following equation:

$$d_i = \{NX_{i1}, NX_{i2}, \text{width}(X_i), \text{service class}(X_i)\} \qquad \text{Equation 1}$$

Moreover, the group of traffic demands represents "set" of the traffic demand and is given by a following equation:

$$D = \{d_1, d_2, d_3, \ldots d_n\}.$$

When each piece of the above designing information is input, the communication path designing device, in order to produce various kinds of constraint conditions and objective functions, performs processing of creating a path candidate use facility function and condition (Step S2), processing of creating a link receiving condition (Step S4), processing of creating a queue receiving condition (Step S5), and processing of creating an optimizing reference (Step S6). Moreover, the above processing may be performed in arbitrary order or simultaneously.

In the processing of creating path candidate use facility functions and conditions, a function indicating whether or not each of the link, node, and queue is used for every candidate for a input path, and a function indicating which path is selected from the candidates are individually defined and, by using these functions, a constraint condition required for selection of a path that can satisfy each traffic demand is produced.

Specifically, as a function to indicate whether or not a link is to be used, $$\psi_p^{LZ}$$

is defined, which has a value "1" when a path candidate $e_p$ passes through a link LZ and has a value "0" when the path candidate does not pass through the link LZ.

Moreover, as a function to indicate whether or not a node is to be used, $$\psi_p^{NX}$$

is defined, which has a value "1" when a path candidate $e_p$ passes through a node NX and has a value "0" when the path candidate does not pass through the node NX.

Furthermore, as a function to indicate whether or not a queue is to be used, $$\psi_p^{QXY}$$

is defined, which has a value "1" when a path candidate $e_p$ passes through a queue $Q_{XY}$ and has a value "0" when the path candidate does not pass through the queue $Q_{XY}$.

Then, a constraint condition used to select each of the path candidates that can satisfy a requirement for every traffic demand is produced. Here, as a function $$"\delta_p^n"$$

is defined, which has a value "1" when the path candidate $e_p$ is contained in a solution for an arbitrary traffic demand $d_n$ existing in a group of the traffic demand and has a value "0" when the path candidate $e_p$ is not contained in the solution for the arbitrary traffic demand $d_n$ existing in the group of the traffic demand.

Then, as a constraint condition corresponding to the traffic demand $d_n$, "$\Sigma\{\delta_p^n | e_p$ being path candidate satisfying $d_n\} = 1$" is produced.

In the processing of creating the link receiving condition, a constraint condition on a link is produced based on a device capacity (processing capability) of a link. Specifically, a constraint condition $$"\sum_n \sum_p \delta_p^n \psi_p^{LZ} \text{width}(X_n) \leq C_{LZ}"$$

is produced which represents that total transfer bands required by the traffic demand do not exceed facility capacity of a link.

In the processing of creating node receiving conditions, a constraint condition on a node is produced based on a device capacity (processing capability) of a node. Specifically, a constraint condition $$"\sum_n \sum_p \delta_p^n \psi_p^{NX} \text{width}(X_n) \le C_{NX}"$$

is produced which represents that total transfer bands required by the traffic demand do not exceed the device capacity of a node.

In the processing of creating queue receiving conditions, a constraint condition on queuing based on a device capacity (processing capability). Specifically, a constraint condition $$"\sum_n \sum_p \delta_p^n \psi_p^{QXY} \text{width}(X_n) \le C_{QXY}"$$

is produced which represents that total transfer bands required by the traffic demand do not exceed a capacity given to a queue.

In the processing of creating an optimizing reference, an objective function is produced based on the input optimizing reference. For example, when total delay time in the communication path is minimized, the objective function is given as $$"\text{Minimum} \sum_n \sum_p \sum_Z \delta_p^n \psi_p^{LZ} T_{LZ} + \sum_n \sum_p \sum_{XY} \delta_p^n \psi_p^{QXY} T_{QXY}"$$

which minimizes delay time $T_{LZ}$ in each link LZ and delay time $T_{QXY}$ in each queue. In this embodiment, though an objective function which minimizes total of delay time in all paths corresponding to a group of traffic demands is produced, the objective function which minimizes delay time in a path corresponding to every group of the traffic demands may be produced.

The communication path designing device that has completed production of various constraint conditions and objective functions selects and decides a communication path that can meet every traffic demand by solving mathematical programming problems made up of these constraints and objective functions in the processing of optimization (Step S7).

Moreover, to solve mathematical programming problems, for example, a mathematical programming method such as a cutting plane method, branch and bound method, or a like disclosed in "Mathematical Handbook" compiled under the supervision of Yano (Morikita Publishing Co.) may be used.

If a plurality of paths is obtained as a result of the processing of optimization, an arbitrary path may be selected out of the plurality of paths. If any path cannot be obtained, since it cannot be acquired unless a network resource used is changed and a constraint condition employed is altered, the communication path designing device displays a message informing that creation of the path is impossible on an output device 30, or a like.

Thus, according to the embodiment, by creating a constraint condition on each queue mounted in a node for every service class and by creating a constraint condition on a link or a node to be shared for every service class and by solving mathematical programming problems, a communication path that can satisfy a traffic demand is selected and decided more effectively when compared with a method in which a communication path is designed to satisfy most rigorous conditions required in a service class or in which a link or a node is assigned to every service class. Moreover, since a plurality of communication paths each satisfying each of a plurality of traffic demands, it is possible to simultaneously perform designing of a communication path for a plurality of service classes.

In the above description, the processing unit 10 in the communication path designing device performs processing of creating path candidate use device functions and conditions, processing of creating link receiving conditions, processing of creating node receiving conditions, processing of creating queue receiving conditions, processing of creating optimizing references, and processing of optimization, however, the communication path designing device has a configuration that can perform a plurality of processing ways each executing the above processes.

EXAMPLE

In this embodiment, a comparison example (being equivalent to the conventional technology) in which links and queues are assigned according to a service class and a designing example in which links are shared according to a service class are described.

Networks employed both in the comparison example and the designing example commonly have the configuration shown in FIG. 1 and here a case where two classes (for example, AF-UDP and AF-TCP and the AF is not divided into 1 to 4 classes) are required as a service class is explained. Therefore, the number of queues that each node has is 2.

Moreover, in order to simplify descriptions below, a capacity of each of the links LZ (Z=1 to 7) is represented as $C_{LZ}=4$ and a capacity of each of the nodes NX (X=1 to 5) is represented as $C_{NX}=10$. The capacity of the queue is divided into each service class at a rate of 1:1. That is, a capacity of each of the queues is represented as $C_{QXY}=5$.

Moreover, four traffic demands "a" to "d" described below are input. However, items inside parentheses represent an entrance node, exit node, transfer band (capacity), and service class in order.

a. Traffic demand 1 (node N4, node N2, 1, AF-UDP)
b. Traffic demand 2 (node N5, node N1, 2, AF-UDP)
c. Traffic demand 3 (node N4, node 2, 3, AF-TCP)
d. Traffic demand 4 (node N4, node 2, 2, AF-TCP)

Comparison Example

First, a comparison example in which links and queues are assigned according to a service class will be described.

In the comparison example, each of the links LZ is divided at a rate of 1:1 as in the case of the queue. In that case, a capacity of each of the links is represented as $C_{LZ}=2$. In that case, a capacity of each of the links is represented as $C_{LZ}=2$.

Therefore, in the case of the above traffic demand 3, since a required capacity (transfer band) is "3", in the comparison example, it is impossible to obtain a communication path that can satisfy the traffic demand 3.

Designing Example

Next, the designing example in which the link is shared for each of the service classes is explained.

Moreover, for an optimizing reference, total delay time of a path is minimized. In this case, an objective function to be produced by the processing of creating the optimizing reference is given as $$\text{"Minimum} \sum_n \sum_p \sum_Z \delta_p^n \psi_p^{LZ} T_{LZ} + \sum_n \sum_p \sum_{XY} \delta_p^n \psi_p^{QXY} T_{QXY}",$$

as in the case described above. Here, delay time in each of the links $LZ$=100 [ms] and delay time in each of the queues $T_{QXY}$=200 [ms]. In the designing example, since the link LZ is shared according to a service class, a capacity of the link is represented as $C_{LZ}$=4. Therefore, it is possible to obtain each of the communication paths that can satisfy traffic demands represented as the above "a" to "d" and delay time of a communication path corresponding to each of the traffic demands is given as below.

Delay time of traffic demand 1=200×3+100×2=800 [ms]
Delay time of traffic demand 2=200×2+100×1=500 [ms]
Delay time of traffic demand 3=200×3+100×2=800 [ms]
Delay time of traffic demand 4=200×3+100×2=800 [ms]

Moreover, a sum of the above delay time can be given as 800+500+800+800 [ms]=2.9 [s]. This value is an optimal solution in a designing example and is one of optimal solutions of mathematical programming problems made up of constraint conditions and objective functions.

It is apparent that the present invention is not limited to the above embodiments but may be changed and modified without departing from the scope and spirit of the invention.

What is claimed is:

1. A method for designing a communication path to be used according to a service class on a network having a plurality of nodes being able to receive packets to be processed according to a plurality of service classes being different from each other with each of said packets being distinguished from each other and having a plurality of links serving as a transmission path used to establish connection between nodes each receiving packets to be processed according to said plurality of service classes being different from each other, said method comprising;
   a first step of producing a first constraint expression to be used as a constraint condition for selecting a communication path that satisfies a traffic demand containing requirements for said communication path;
   a second step of producing a second constraint expression to be used as a constraint condition based on a resource of said network to be shared according to said plurality of service classes;
   a third step of producing a third constraint expression to be used as a constraint condition based on a resource of said network to be provided according to said plurality of service classes;
   a fourth step of producing an objective function to be used as a reference for selection of optimized said communication path; and
   a fifth step of designing said communication path by solving a mathematical programming problem made up of said first constraint expression produced in said first step, said second constraint expression produced in said second step, said third constraint expression produced in said third step, and said objective function produced in said fourth step.

2. The method for designing a communication path according to claim 1,
   wherein said second step includes creating a link receiving condition to produce a deterministic constraint expression to be used so that a total transfer band required in said traffic demand does not exceed a device capacity of said link and creating a node receiving condition to produce a deterministic constraint expression to be used so that a total transfer band required in said traffic demand does not exceed a device capacity of said node; and
   wherein said third step includes creating a queue receiving condition to produce a deterministic constraint expression to be used so that a total transfer band required in said traffic demand does not exceed a transfer band of said queue, based on a transfer band set in advance in said queue which is mounted on said node according to said service class and saves temporarily data of said packet.

3. A communication path designing device for designing a communication path to be used according to a service class on a network having a plurality of nodes being able to receive packets to be processed according to a plurality of service classes being different from each other with each of said packets being distinguished from each other and having a plurality of links serving as a transmission path used to establish connection between nodes each receiving packets to be processed according to said plurality of service classes being different from each other, said communication path designing device comprising:
   a processing unit to perform a first process of producing a first constraint expression to be used as a constraint condition for selecting a communication path that satisfies a traffic demand containing requirement for said communication path;
   a second process of producing a second constraint expression to be used as a constraint condition based on a resource of said network to be shared according to said plurality of service classes;
   a third process of producing a third constraint expression to be used as a constraint condition based on a resource of said network to be provided according to said plurality of service classes;
   a fourth process of producing an objective function to be used as a reference for selection of optimized said communication path; and
   a fifth process of designing said communication path by solving a mathematical programming problem made up of said first constraint expression produced in said first process, said second constraint expression produced in said second process, said third constraint expression produced in said third process, and said objective function produced in said fourth process.

4. The communication path designing device according to claim 3,
   wherein said second process includes creating a link receiving condition to produce a deterministic constraint expression to be used so that a total transfer band required in said traffic demand does not exceed a device capacity of said link and creating a node receiving condition to produce a deterministic constraint expression to be used so that a total transfer band required in said traffic demand does not exceed a device capacity of said node; and wherein said third process includes creating a queue receiving condition to produce a deterministic constraint expression to be used so that a total transfer band required in said traffic demand does not exceed a transfer band of said queue, based on a transfer band set in advance in said queue which is mounted on said node according to said service class and saves temporarily data of said packet.

5. A program embodied in a computer readable medium to have a computer design a communication path to be used according to a service class on a network having a plurality of nodes being able to receive packets to be processed according to a plurality of service classes being different from each other with each of said packets being distinguished from each other and a plurality of links serving as a transmission path used to establish connection between nodes each receiving packets to be processed according to said plurality of service classes being different from each other, said program executing:

a first process of producing a first constraint expression to be used as a constraint condition for selecting a communication path that satisfies a traffic demand containing requirement for said communication path;

a second process of producing a second constraint expression to be used as a constraint condition based on a resource of said network to be shared according to said plurality of service classes;

a third process of producing a third constraint expression to be used as a constraint condition based on a resource of said network to be provided according to said plurality of service classes;

a fourth process of producing an objective function to be used as a reference for selection of optimized said communication path; and a fifth process of designing said communication path by solving a mathematical programming problem made up of said first constraint expression produced in said first process, said second constraint expression produced in said second process, said third constraint expression produced in said third process, and said objective function produced in said fourth process.

6. The program to have a computer execute the processing according to claim 5, wherein said second process includes creating a link receiving condition to produce a deterministic constraint expression to be used so that a total transfer band required in said traffic demand does not exceed a device capacity of said link and creating a node receiving condition to produce a deterministic constraint expression to be used so that a total transfer band required in said traffic demand does not exceed a device capacity of said node; and wherein said third process includes a process of creating a queue receiving condition to produce a constraint expression to be used so that a total transfer band required in said traffic demand does not exceed a transfer band of said queue, based on a transfer band set in advance in said queue which is mounted on said node according to said service class and saves temporarily data of said packet.

7. The method of claim 1, wherein the first, second and third constraint expressions are deterministic constraint expressions.

8. The device of claim 3, wherein the first, second and third constraint expressions are deterministic constraint expressions.

9. The program of claim 5, wherein the first, second and third constraint expressions are deterministic constraint expressions.

* * * * *